United States Patent Office 3,574,060
Patented Apr. 6, 1971

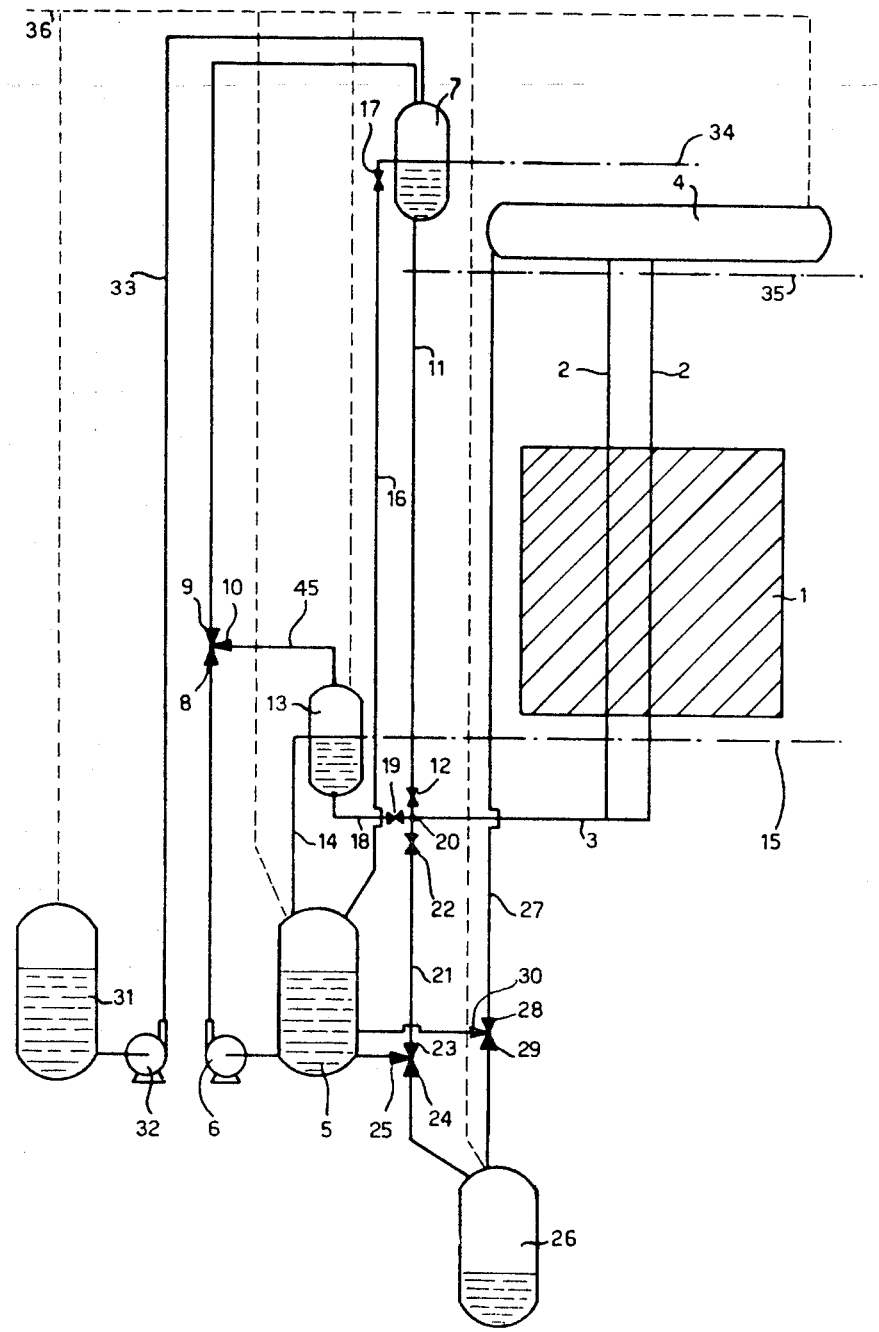

3,574,060
LIQUID SAFETY ROD SYSTEM FOR NUCLEAR REACTORS
Sergio Galli de Paratesi, Varese, and Alberto Agazzi, Bergamo, Italy, Armando Broggi, Santa Fe, Argentina, and Luciano Ghiurghi, Varese, Italy, assignors to European Atomic Energy Community (Euratom), Brussels, Belgium
Filed Oct. 18, 1968, Ser. No. 768,637
Claims priority, application Belgium, Oct. 26, 1967, 50,094
Int. Cl. G21c 7/22
U.S. Cl. 176—86                        7 Claims

ABSTRACT OF THE DISCLOSURE

A liquid safety rod system for a nuclear reactor comprising a plurality of tubes extending through a reactor core and connected to a lower collector, upper and lower poison solution reservoirs, conduit means including a pump connecting the upper and lower reservoirs for transferring poison solution from the lower to the upper reservoir, a valve controlled conduit connecting the upper reservoir and the lower collector to permit the flow of poison solution from the upper reservoir through the collector and into the tubes in an emergency situation; and further including a washing circuit comprising essentially a washing-liquid reservoir, a pump and a washing-residue reservoir operatively connected to permit the safety-rod tubes to be cleansed of poison solution.

---

The invention relates to safety rod systems for nuclear reactors.

The safety rods of a nuclear reactor are basically an emergency device. Among the various types of safety rod used, liquid rods have pronounced advantages, including the facility of placing them on any surface of the reactor and their small overall size.

The latter enables the rods to be placed at the desired points without having to remove or omit fuel elements to make room for them. Another great advantage of their great simplicity and small overall size is that no solid rod motor on a surface of the reactor hampers the operation of the loading and unloading machine. Furthermore, the hollow tubes forming the safety rods may have complicated sections, shapes and courses to make room for other devices.

The liquid-safety-rod system of the present invention uses gravity as a driving force.

The invention provides a liquid-safety-rod system for a nuclear reactor comprising upwardly extending tubes passing through the reactor core and connected at their lower ends to one or more lower collectors or headers, a lower reservoir for neutron poison solution below the level of the lower collector, an upper reservoir or accumulator for poison solution above the top of the reactor core, a conduit connection including a pump between the lower and upper reservoirs for transferring poison solution from the lower to the upper reservoir, a valve-controlled conduit connection from the upper reservoir to the lower collector or collectors for flow of poison solution into the tubes, an overflow poison solution reservoir or accumulator connected to the lower collector through a valve controlled conduit and having an overflow discharge conduit at a level just below the lower ends of the tubes to determine the normal operating level of the poison solution said discharge conduit leading to the lower poison solution reservoir which is at a level below that of the overflow reservoir.

In a more specific form the system comprises hollow tubes passing through the reactor core, lower and upper collectors or headers, and a washing circuit comprising essentially a washing-liquid reservoir, a pump and a washing-residue reservoir, and has the feature that it comprises a lower reservoir for poison solution below the level of the lower collector connected by means of a pump to an upper poison solution accumulator situated above the level of the reactor core, the upper accumulator being connected to the lower collector by means of a valve situated at the inlet of the latter, the lower collector also being connected by means of another valve and conduit to an overflow accumulator for poison solution with a discharge pipe starting at a level just below the inlets of the hollow tubes in the reactor core and terminating in the lower-poison-solution reservoir, situated lower than it.

The invention will be more readily understood by reference to the accompanying diagram of one example of an installation according to the invention.

In this diagram hollow tubes such as 2 pass through the core 1 of the reactor. They issue from one or several lower collectors or headers 3 below the level of the core, and their upper ends terminate in an upper collector or header 4 above the level of the core.

In the diagram a single lower collector 3 is shown, but it is obvious that, from the point of view of the inventive idea, any number may be provided. The upper collector 4 may advtantageously be of the penetrating-rod type described in Belgian specification No. 678,235 filed by the applicants on the 22nd of March 1966. The poison-solution circuit is composed of a lower poison-solution reservoir 5, from which the solution is pumped by a pump 6 to an upper reservoir or accumulator 7 above the level of the core of the reactor. A three-way valve 8, 9, 10 is inserted in the tube from the pump 6 to the reservoir 7. A conduit 11 issuing from the bottom of the reservoir 7 terminates in the lower collector 3 and is controlled by means of a valve 12 near the connection 20 to the lower collector 3. An overflow reservoir 13 has a discharge pipe 14 starting at a level 15 just below that of the reactor core. This is the level to which the solution in the rods arrives when they are ready to operate. The pipe 14 discharges the overflow from the reservoir 13 into the reservoir 5. A tube 4 connects the three-way valve 8, 9, 10 to the reservoir 13. The latter is connected at the bottom to the collector 3 by a tube 18 with a valve 19 near the connection 20.

The reservoir 7 has a discharge pipe 16 starting from the level 34 and provided with a valve 17 in the vicinity of its exit from the reservoir 7. The pipe 16 also terminates in the reservoir 5.

From the connection 20 there also issues a conduit 21 having, near this connection, a simple valve 22 and, at the level of the bottom of the reservoir 5, a three-way valve 23, 24, 25, the way 25 of which communicates with the bottom of the reservoir 5, while the way 24 communicates with a residue reservoir 26. The discharge pipe 27 of the upper collector 4 terminates, by means of a three-way valve 28, 29, 30, either in the reservoir 26 (by the way 29) or in the reservoir 5 (by the way 30).

A washing circuit is associated with the present safety-rod system. It comprises a washing-liquid reservoir 31, a conduit issuing from its bottom and leading to a pump 32 and a conduit 33 terminating at the top of the reservoir 7.

The gaseous atmospheres of all the reservoirs, together with that of the upper collector 4, are connected by means of piping shown in FIG. 1 in broken lines to low pressure 36.

The operation of the system that has just been described is explained below. To put the system in a state in which the rods can be introduced rapidly, it suffices to pump the poison-solution from the reservoir 5 into the reservoir 7 by operating the pump 6, the valve 8, 9, 10 being open in the directions 8, 9, the valve 22 being closed and the valves 12 and 19 being open. As soon as the system is filled up to the level 15, the valves 12 and 19 are closed, and the system is filled up to the level 34, the valve 17 being open. The pump 6 is then stopped.

The reservoir 7 is constructed so that it contains below the level 34 a quantity of poison solution such that it can fill the tubes 2 conected to it by the valve 12 up to the level 35 between the core 1 and the upper collector 4. The reservoir 7 being filled up to the level 34 and the valve 12 being closed, the system is ready for emergency introduction.

An alarm signal opening the valve 12 enables the rods 2 to be introduced as far as the level 35, the valves 19 and 22 being closed. The level of the solution will be kept at 35 as long as required by a simple communicating-vessel effect. To extract the rods, it suffices to close the valves 12 and 22 and open the valve 19, bringing the rods into communication with the overflow reservoir 13, which stabilizes their level at 15. To make the system once again able to effect a fresh introduction, it suffices to fill the reservoir 7 once again up to the level 34, carrying out the operations mentioned above once again.

The system according to the invention also enables poison solution to be circulated after the introduction of the rods. This is useful, for example, when the solution tends to boil after introduction or to deteriorate chemically and physically if it is left motionless in the core.

To circulate the solution, all that is necessary is to start the pump 6, open the valve 8, 9, 10 in the direction 8, 9, and close the valve 17, 12 remaining open and the valve 28, 29, 30 being open in the directions 28, 30.

If it is desired to wash the system (this is useful if the solution is of a type such that it may cause deposits or incrustations on the tubes), the valves 12 and 22 merely have to be opened. The valve 23, 24, 25 must be open in the directions 23, 25. In this way the poison solution is entirely returned to the reservoir 5. Then, the valve 12 remaining open, the valves 19, 22 and 17 are closed and the valve 28, 29, 30 opened in the positions 28, 29. Then the pump 32 is started and the system is washed.

Before filling the system with poison solution again, it suffices to empty it of the washing residues in the reservoir 26, leaving the valve 12 open and opening the valve 22, the valve 23, 24, 25 being open in the positions 23, 24.

The invention is not limited to the exemplifying embodiment just described, but includes any variants. It is thus possible without going beyond the scope of the invention to use several reservoirs 7, each of them being connected to one or several lower collectors 3.

We claim:

1. A liquid-safety-rod system for a nuclear reactor comprising upwardly extending tubes passing through the reactor core and connected at their lower ends to at least one lower collector, a lower reservoir for neutron poison solution below the level of said lower collector, an upper reservoir for said poison solution above the top of the reactor core, a conduit connection including a pump between said lower and upper reservoirs for transferring poison solution from said lower to said upper reservoir, a valve-controlled conduit connection from said upper reservoir to said lower collector for flow of poison solution into the tubes, said valve being normally closed except primarily in case of emergency to maintain said tubes void of poison solution, an overflow poison solution reservoir connected to said lower collector through a valve controlled conduit and having an overflow discharge conduit at a level just below the lower ends of said tubes to determine the normal operating level of the poison solution, said discharge conduit leading to said lower poison solution reservoir which is at a level below that of said overflow reservoir.

2. A liquid-safety-rod system for nuclear reactors having hollow tubes passing through the reactor core, at least one lower and at least one upper collector, a washing circuit comprising essentially a washing-liquid reservoir connected to a pump by conduit means, said washing circuit being connected to an upper poison-solution accumulator by conduit means, a lower poison-solution reservoir below the level of said lower collector, connected by means of a pump to said upper poison-solution accumulator above the level of the reactor core, said upper accumulator being connected to said lower collector by means of a conduit and valve at the inlet of said lower collector, said valve being normally closed except primarily in case of emergency to maintain said tubes void of poison solution, said lower collector also being connected by means of another valve and conduit to an overflow poison-solution accumulator with a discharge pipe starting at a level just below that of the inlets to the lower ends of the hollow tubes in the reactor core and terminating in the lower poison-solution reservoir, situated lower than it.

3. The apparatus of claim 2, wherein the gaseous atmosphere above the poison-solution in the upper accumulator and the overflow accumulator are brought into communication with a constant low pressure to which the gaseous atmospheres of said upper collector said lower poison-solution reservoir, said washing-liquid reservoir and a residue reservoir are also connected.

4. The apparatus of claim 2, further comprising an overflow pipe connecting said upper accumulator to said lower reservoir and having a valve in the vicinity of its opening in the upper accumulator.

5. The apparatus of claim 2, further comprising a pipe issuing from said lower collector, said pipe being connected to said poison-solution reservoir and to a washing-residue reservoir by means of a three-way valve.

6. The apparatus of claim 2, further comprising a pipe terminating in said overflow accumulator and issuing from a three-way valve disposed on a conduit connecting said poison-solution pump to said upper accumulator.

7. A liquid-safety-rod system for a nuclear reactor comprising upwardly extending tubes passing through the reactor core and connected at their lower end to at least one lower collector located below the bottom of said reactor core, at least one upper collector located above the top of the reactor core, a lower reservoir for neutron poison solution below the level of said lower collector, an upper reservoir for said poison solution above the top of the reactor core, said upper reservoir having a discharge conduit at a level above the bottom of said upper collector, a conduit connection including a pump between said lower and upper reservoirs for transferring poison solution from said lower to said upper reservoir, a valve-controlled connection from said upper reservoir to said lower collector for flow of poison solution into the tubes, said valve being normally closed except primarily in case of emergency to maintain said tubes void of poison solution, an overflow poison solution reservoir connected to said lower collector through a valve controlled conduit and having an overflow discharge conduit at a level just below the lower ends of said tubes to determine the normal operating level of the poison solution, said discharge conduit leading to said lower poison-solution reservoir which is at a level below that of said overflow reservoir, and a residue reservoir below the level of said lower poison solution reservoir, connected by means of valved conduits to said lower reservoir, said upper reservoir, said overflow reservoir, said lower collector and said upper collector.

References Cited

UNITED STATES PATENTS

| 2,874,109 | 2/1959 | Cooper. | |
|---|---|---|---|
| 3,231,473 | 1/1966 | Hennig | 176—22X |
| 3,414,476 | 12/1968 | De Paratesi et al. | 176—86 |

FOREIGN PATENTS

| 1,206,101 | 12/1965 | Germany | 176—22 |
|---|---|---|---|
| 799,001 | 7/1958 | Great Britain | 176—22 |
| 927,438 | 5/1963 | Great Britain | 176—22 |
| 803,701 | 10/1958 | Great Britain | 176—86 |

CARL D. QUARFORTH, Primary Examiner

H. E. BEHREND, Assistant Examiner